March 23, 1965  E. BECKER ETAL  3,174,450
SEWING MACHINES
Filed Oct. 28, 1960  3 Sheets-Sheet 3

Inventors
ERNST BECKER
ERWIN ZAVADA
by Paul M. Craig Jr.
Attorney

United States Patent Office 3,174,450
Patented Mar. 23, 1965

3,174,450
SEWING MACHINES
Ernst Becker and Erwin Zavada, Darmstadt, Germany, assignors to Firm Quick-Elektromotorenwerk G.m.b.H., Darmstadt, Germany
Filed Oct. 28, 1960, Ser. No. 65,848
Claims priority, application Germany, Oct. 31, 1959, Q 598
24 Claims. (Cl. 112—219)

This invention relates to improvements in sewing machines and is particularly concerned with drive means in sewing machines having a control system for stopping the sewing machine when the arm shaft is in a predetermined angular position. Drive means of this kind comprise a high-speed principal drive and a low-speed auxiliary drive. For stopping the machine the arm shaft of the machine is disconnected from the principal drive and connected with the auxiliary drive which brings the sewing machine to a stop so that the needle of the sewing machine is arrested in a desired position.

In a sewing machine of this type it is desired not only to stop the arm shaft of the sewing machine in a predetermined angular position but also continuously to start and stop the sewing machine at frequent intervals. Although known drive means for sewing machines permit this kind of operation to be performed, the time required for stopping the machine, that is to say the time which elapses between the initiation of the stopping process and its completion is relatively long. Consequently, the time which is lost when a machine is repeatedly started and stopped may be considerable. It is one of the objects of the present invention to reduce this loss of time.

In order to achieve this object many difficulties must be overcome, because for stopping the needle in a desired final position the arm shaft drive must be transferred from the principal drive to the auxiliary drive and the final stopping of the sewing machine cannot be effected until this has been done and no further slippage takes place in the clutch between the arm shaft and the auxiliary drive. In other words, the decleration of the machine from the instant the stopping operation is initiated must in fact be delayed. Account has been taken of this circumstance in the construction of such a machine by incorporation in the circuit for controlling the drive means of a delayed action relay which delays the instant at which the auxiliary drive is switched off. Apart from the delay introduced by the action of the relay the overall time required for stopping is further prolonged because in the known drive means the auxiliary drive is not set in motion until the arm shaft of the sewing machine has been disconnected from the principal drive. The time required for accelerating the auxiliary drive from zero to the normal rotational speed of the auxiliary drive therefore operates further to prolong the total time required for stopping.

Another factor which lengthens the stopping time is that the auxiliary drive must run at a relatively slow speed to ensure that the sewing machine will stop in the desired angular position when the auxiliary drive is switched off. The permissible difference between the actual stopping position and the desired stopping position should be less than 10° in the position of the balance or hand wheel of the sewing machine.

A relatively long time will have already elapsed between the instant the stopping process is initiated and the instant the arm shaft runs at the full rotational speed of the auxiliary drive, which may be for instance 300 r.p.m. Another relatively long interval of time then elapses before the arm shaft of the sewing machine is finally stopped. It is another object of the present invention also to reduce this interval of time.

In known drive means for sewing machines comprising a control for stopping the arm shaft in a predetermined angular position it is actually possible for the auxiliary drive to be re-accelerated after it has been switched off and before the machine finally stops. This invention is based upon drive means which will cause the arm shaft of the machine to be stopped in a predetermined angular position, and which comprise a principal drive and an auxiliary drive as well as control means and a synchronising unit. With drive means of the specified kind the invention consists in that the mechanical activation of the principal drive causes a contact to operate for closing the circuit of a special device which starts up the auxiliary drive, and in that there is provided, in parallel with the first contact, a switch means which opens in dependence upon the speed of the arm shaft of the machine, and which is bridged by the synchronising unit, the time constants of the switch means and of the elements of the device being small.

In a drive means for a sewing machine of the proposed kind the engagement of the shaft of the sewing machine by the principal drive simultaneously causes the auxiliary drive, to be started up. Consequently, the clutch member associated with the auxiliary drive will already revolve at the full speed of the auxiliary drive when the process of stopping the arm shaft of the machine is initiated. Although the possibility of continuously running this clutch member might be envisaged, this is not very desirable because of the wear this would impose upon the bearings and gears. The simultaneous activation of the auxiliary drive when the sewing machine is run up or accelerated to high speed already prepares the way for the subsequent process of stopping the machine.

The switch which operates in dependence upon the rotational speed of the arm shaft, and which lies in a shunt circuit connected across the contact which prepares the stopping process, opens as soon as the arm shaft drops to a predetermined speed limit. In other words, when the arm shaft reaches this predetermined speed, the final operation of switching off the auxiliary drive is left to the synchronising unit.

It will therefore be understood that the drive means proposed by the present invention comprises three switches. One switch ensures that the auxiliary drive is immediately accelerated to its full auxiliary driving speed when the stopping process is initiated. This switch opens when the clutch between the arm shaft of the machine and main drive is disengaged. A second switch determines the speed at which the third switch embodied in the synchronising unit finally switches off the auxiliary drive. The three switches therefore constitute a sequence switching device which permits the process of stoppage to be performed in a continuous smooth and rapid action, the entire operation, after its initiation, proceeding completely automatically, the several switches each performing a single functional operation to which they may be specially adapted, whereas the time constants of the several elements are short. The automatic operation of stopping the machine begins when the operator releases a foot pedal. This causes the switch to open which prepares the switching-off process and, as soon as the speed of revolution of the arm shaft drops to the predetermined level, the second switch which operates by reference to the speed of revolution likewise opens and thus permits the synchronising unit to interrupt the power supply to the auxiliary drive to bring the arm shaft to a stop.

In order to prevent overcontrol, that is to say, in order to prevent re-acceleration of the auxiliary drive once this has been switched off, it is preferred to associate with the device for coupling the auxiliary drive a holding contact adapted to disconnect from said device the synchronising unit and the switch in the shunt across the synchronising unit.

The device for coupling the auxiliary drive may be a relay or switch means in the form of a valve.

Conveniently, the switching operation which depends upon the speed of the arm shaft of the sewing machine may be controlled by a tachometer-type generator arranged to operate a switching relay. Alternatively, a useful arrangement consists in replacing the tachometer-type generator and its associated relay by a condenser placed in parallel with the synchronising unit.

The inertia mass of the coupling members of the auxiliary drive is arranged to be as small as possible in order to permit the device which engages and disengages the coupling clutch to operate quickly. For this reason, and since the reduction gearing in the auxiliary drive is self-locking, the machine will come to a stop quickly after the coupling means have been disengaged.

The small mass which must be moved for cutting out the auxiliary drive permits this operation to take place at a relatively high speed of revolution of the auxiliary drive and the machine to be switched off at this higher speed. In other words, the auxiliary drive may be allowed to rotate at a higher speed, the arm shaft may be transferred at this higher speed to the auxiliary drive and then brought to a standstill from this higher rotational speed.

The described sequence switching arrangement, as such, already reduces the overall time required for stopping very considerably. This time is now further reduced by the fact that the auxiliary drive can take over the drive of the arm shaft at a higher speed than was possible heretofore.

In order that the present invention may be more readily understood reference will now be made to the accompanying drawing in which:

FIGURE 1a is a simplified showing of the circuit used in connection with the system of FIGURE 1.

FIGURE 2a is a simplified showing of the circuit used with the system of FIGURE 2.

Figure 1:
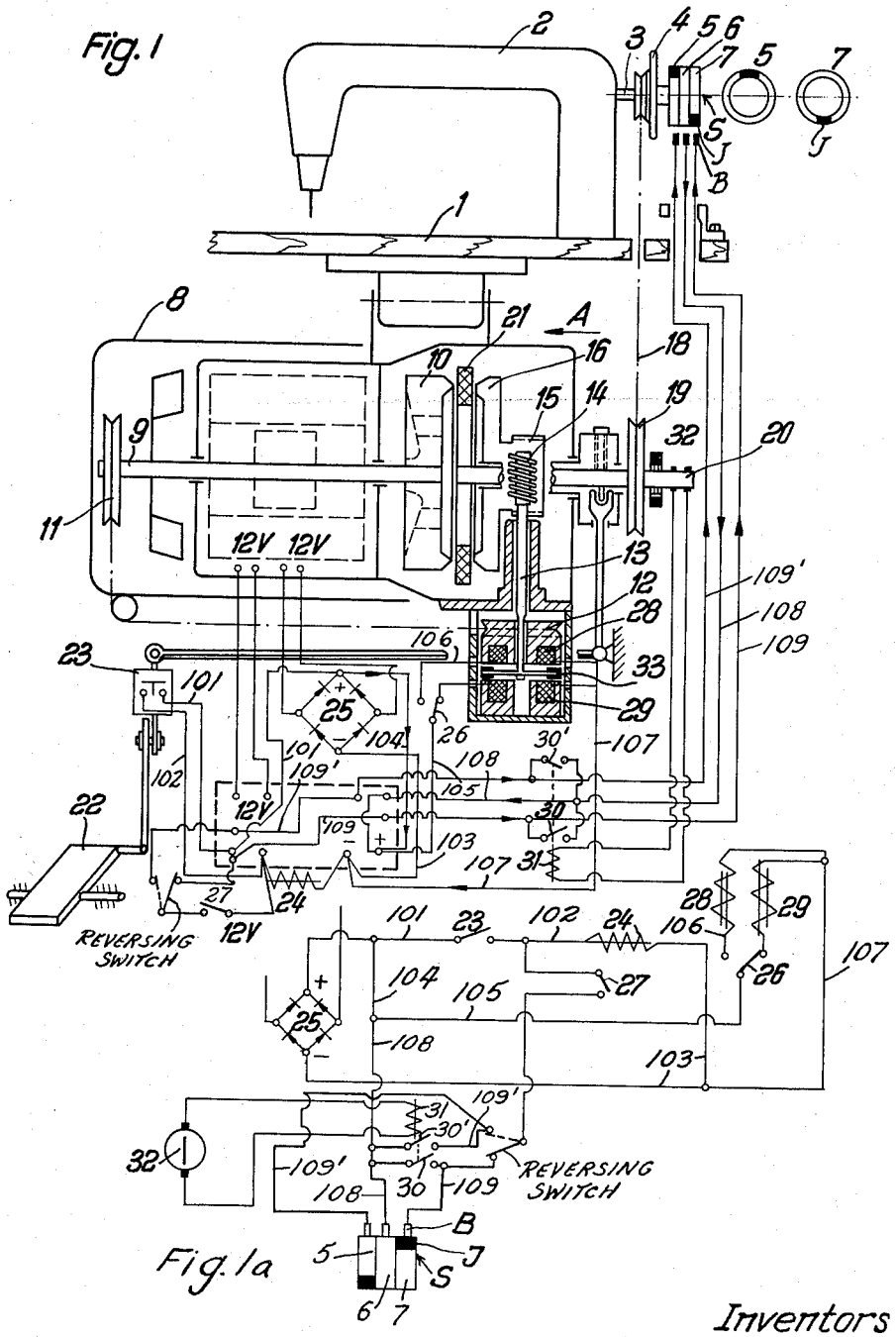
FIGURE 1 is a sewing machine with a sequence switching system incorporating a tachometer generator.

In the figures, FIG. 1 shows the drive means of a sewing machine in which the stopping of the machine may proceed in this way. The bedplate 1 of the sewing machine carries the sewing arm 2 with arm shaft 3. Rigidly mounted on the arm shaft are a balance or hand wheel 4 and slip rings 5, 6 and 7 of the synchronizing unit generally designated by reference character S.

The electrical drive means are mounted under the bedplate of the machine, and comprise a motor 8 with a shaft 9 which directly drives a high-speed clutch disc 10 and, indirectly, through a pulley 11, another pulley 12 which is associated with the auxiliary drive. The latter comprises a shaft 13 with a worm 14 which cooperates with a worm wheel 15 on a clutch member 16 constituting the low-speed drive.

Shaft 3 of the sewing machine is driven by means of a belt schematically indicated by reference numeral 18 from a pulley 19 mounted on shaft 20 which carries the driven member 21 of the clutch. Shaft 20 together with pulley 19 and the driven member 21 of the clutch are shiftable either in the direction of arrow A or opposite thereto. The driven member 21 of the clutch can thus be shifted into engagement either with clutch disc 10 or with clutch disc 16. In the former case member 21 is rotated at high speed and in the latter case at a low speed.

The driven member 21 is arranged to be shifted by means of a rod linkage which is operable by a foot pedal 22. This linkage simultaneously controls an electrical switch 23 of conventional construction. This switch is included in a circuit for energising and deenergising a relay 24 (FIGS. 1 and 1a). The switch 23 is closed when the foot pedal 22 is depressed and at the same time the driven member 21 of the main clutch is shifted in the direction indicated by arrow A, thus coupling the arm shaft with the high-speed clutch disc 10.

The control circuit is D.C.-operated. The D.C. voltage is obtained by rectifying A.C. tapped from motor 8. The rectifier is shown at 25 and consists of a conventional full-wave rectifier bridge.

Relay 24 controls a working contact 26 and a holding contact 27. The working contact 26 lies in the supply circuit of the coupling magnet 28 and of the braking magnet 29 of the auxiliary coupling device.

In a shunt circuit connected across the synchronising unit S is contact 30 of a relay 31. Relay 31 is controlled by a tachometer-type generator 32 mounted on shaft 20. Connected in series with the synchronising unit S and the relay contact 30 in the synchroniser shunt is the holding contact 27 of relay 24.

The sewing machine is started up by depressing the foot pedal 22, thus causing the driven member 21 to be shifted into frictional contact with the high-speed clutch disc 10 of the principal drive. At the same time switch 23 is closed. Consequently relay 24 is energized by voltage supplied from rectifier 25 over a circuit consisting of lines 101, 102 and 103 and thereby operates to shift its contact 26 so as to establish an energizing circuit for the winding of the magnetic clutch 28 over a circuit consisting of lines 104, 105, 106, 107 and 103. Energization of magnetic clutch 28 causes the disk 33 to be attracted thereby, i.e., to be displaced upwardly thereby as viewed in FIGURE 1 whereby the disk 33 together with the shaft 13 and therewith the clutch disk 16 of the auxiliary drive begin to rotate. At the same time, energization of relay 24 also closes the holding contact 27 which establishes a holding circuit through lines 104, 108, slip rings 6 and 7, and line 109 in parallel with the switch 23.

When the foot pedal 22 is released, switch 23 opens. However, the magnetic clutch remains energized for the time being as the holding relay 24 remains energized over the holding circuit including lines 104 and 108, contact 30, line 109, contact 27, relay 24 and line 103, since the tachometer generator 32 generates sufficient voltage to energize relay 31 as soon as the speed of shaft 20 has dropped to the predetermined limiting speed the tachometer generator 32 opens contact 30. When the insulating segment J of slip ring 5 now runs under brush B during the next revolution of shaft 3, relay 24 is de-energised, causing holding contact 27 to open and the braking magnet 29 to be energised by the operation of working contact 26.

Figure 4:
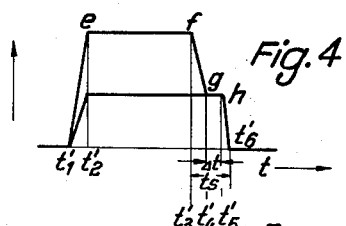
FIGURE 4 is a graph of the rotational speed against time during the stopping operation.

Disc 33 is braked at once. This is possible because only the momentum of the system comprising disc 33, shaft 13 and worm 14 need be overcome. The momentum of the main gearing of the sewing machine need not be braked by the magnetic brake 29 because worm 14 is self-locking. The kinetic energy or inertial mass of the system comprising disc 33, shaft 13 and worm 14 can be kept very low by suitably designing these members, thus permitting the stopping process to be instantaneous when the braking magnet 29 is activated. Since the mass of the system can be kept low, the machine can be stopped when running at a much higher speed than was heretofore possible. For instance, clutch member 16 may revolve at a fairly high speed and the auxiliary drive may be switched off as soon as shaft 20 revolves at this speed. FIG. 4 is a graph which illustrates the manner in which the stopping operation proceeds, in a machine equipped with the proposed drive means.

The sewing machine is started at an instant $t_1'$ by the actuation of the foot pedal by the operator. In other words, the arm shaft of the sewing machine is connected with the principal drive and at the same time the auxiliary drive is started up. At the instant $t_2'$ at point $e$ in the graph the sewing machine reaches its full speed of revolution and it continues to revolve at full speed until at a time $t_3'$ the operator releases the foot pedal. The arm shaft is therefore now disconnected from the principal drive and its speed of revolution will drop from $f$ to the speed represented by point $g$ in the graph. At this point, at the time $t_4'$, the auxiliary drive takes over. Since the speed of the auxiliary drive coincides with the limiting speed $g$ at which the switch 30 controlled by the speed of the arm shaft opens, the synchronising unit S will finally switch off the auxiliary drive at this speed.

According to the angular position of the insulating segment on the synchronising unit when the arm shaft is disconnected from the principal drive, the time interval which elapses from $t_4'$ to $t_5'$ may be slightly longer or shorter. The time interval $t_5$ shown in the graph in FIG. 4 is the maximum possible time which can elapse. At the time $t_6'$ the shaft finally stops.

Once it has been initiated the stopping process is completely automatic, it is much more rapid than heretofore and, as will be understood from the graph in FIG. 4, it also proceeds in a continuous action. The possibility of intermediate re-acceleration is eliminated. When the insulating segment J opens up the circuit consisting of lines 108 and 109, the opening of holding contact 27 de-energizes relay 24 and thereby precludes re-energization thereof without closure of switch 23 even if the holding circuit consisting of lines 108 and 109 became live again. Even if the circuit of the synchronising unit S were re-established, the auxiliary drive would not start up again. The sewing speed of the machine when driven by the auxiliary drive may be several times higher than was the case heretofore. Nevertheless, the machine is directly stopped after the initiation of the stopping process, on the one hand, because the kinetic energy or inertial mass involved is very small and because the time constants of the switching elements are low and, on the other hand, because the automatic stopping operation proceeds with the assistance of a swich which prepares the way for this operation, another switch which accurately determines the speed at which the machine can be switched off, and lastly a switch means which determines the final position at which the needle of the sewing machine comes to a standstill. Despite the high speed of after-control by the auxiliary drive there is complete assurance that the needle will be arrested precisely in the required position.

In FIGS. 1 and 1a, a switch is provided, designated therein as reversing switch to select the position in which the sewing machine will be stopped, that is, with the needle thereof either in the top or bottom dead-center position. The reversing switch can be selectively actuated in any conventional manner to select the circuit including the slip-ring 7 and contact 30 in parallel thereto or the circuit including the slip-ring 5 and analogous elements designated by primed reference numerals. In the particular embodiment, the reversing switch establishes an operative connection by way of line 109, slip-ring 7, or contact 30 with line 108. Upon actuation of the reversing switch, the needle of the sewing machine will be stopped in the opposite position by utilization of the slip-ring 5 and the contact 30' connected in parallel therewith. Analogous elements of the circuit associated with slip-ring 5 are designated by primed reference numerals.

Figure 2:
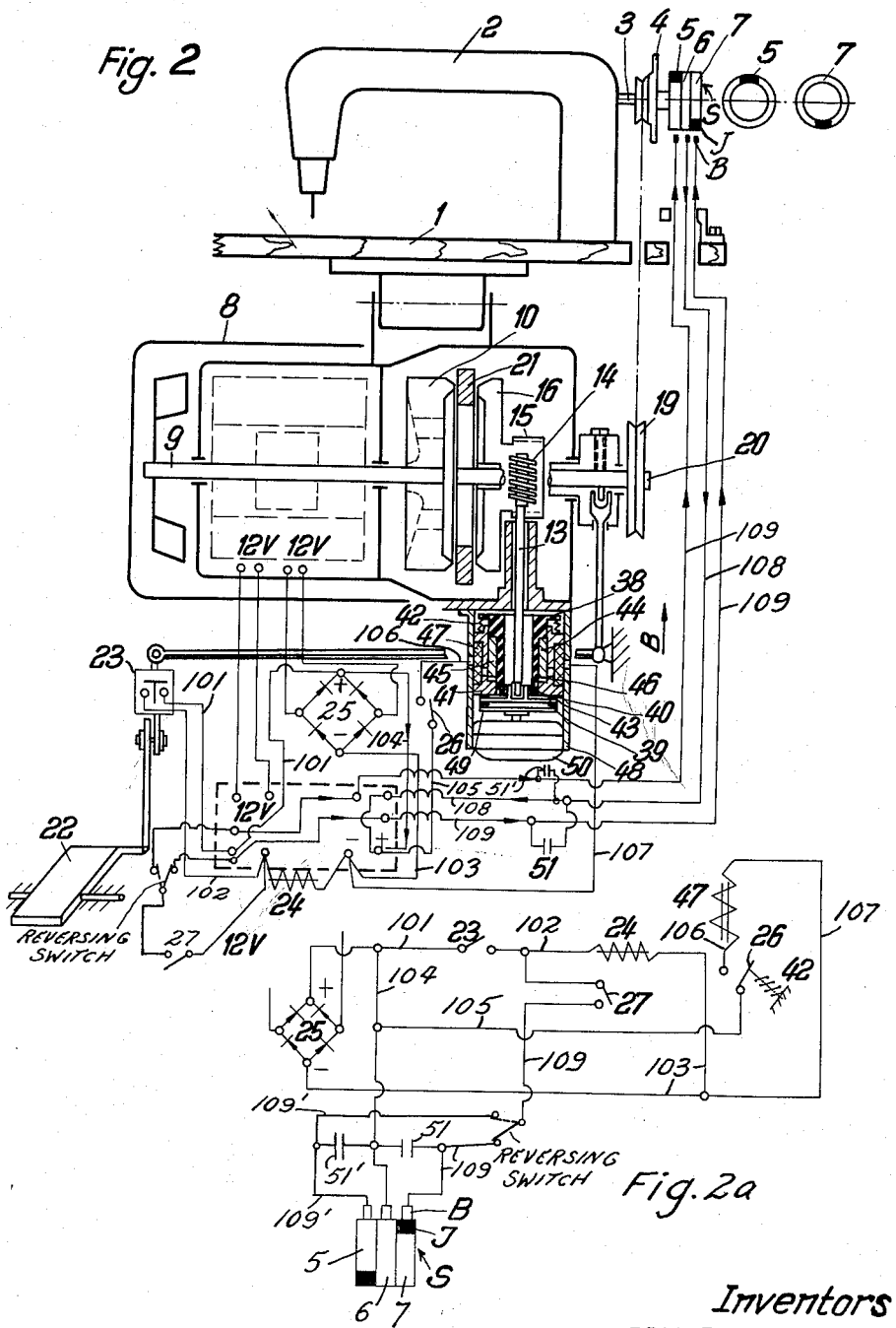
FIGURE 2 is a modified form of construction comprising a sequence switching system which utilises a condenser.

In the embodiment shown in FIG. 2 slip-rings in the magnetic coupling device 28 are eliminated. In this form of construction shaft 13 is surrounded by a hollow cylindrical plunger 38. A disc 39 is mounted within the plunger 38 in antifriction bearings 40. This disc 39 is rotatably coupled with shaft 13 but is free to be axially shifted in and opposite to the direction indicated by arrow B. Plunger 38 and the disc 39 move together in relation to the stationary part 41 of the casing in the direction of arrow B and opposite thereto. A restoring spring 42 urges the plunger 38 into the position shown in FIG. 2 when the magnet 47 is de-energised. In this position the coupling disc 39 bears against a brake lining 43 on the stationary part 41 of the casing. Should shaft 13 be rotating when this occurs it will therefore be immediately braked.

The plunger 38 is surrounded by a tubular member 44 of magnetically conducting material. This tubular member at least partly guides the plunger when it moves axially inside the core 45 of the magnet. Tube 44 projects into the annular flange 46 of the stationary part 41 of the casing and is circumferentially guided by this flange 46.

In this form of construction of the magnet, i.e., of its plunger, the air gap remains very small both when the plunger is activated and when released. The width of the gap is substantially unchanged in either position. Both in the retracted and released position of the plunger 38 the magnetic lines of force take a path nearly wholly in iron. For instance, in the released position of the plunger 38, as shown in FIG. 2, the magnetic lines of force pass from core 45 through plunger 38, the stationary part 41 of the casing, and thence through tube 44 back to the core 45, practically without anywhere leaving the iron.

The coil of the magnet is indicated at 47. Like the core 45 this is fixed within casing 48. Facing the disc 39 is the cooperating disc 49, driven by the slow-speed drive. A special motor 50 is provided for driving the disc 49.

When potential is applied to coil 47 and the magnet is energised plunger 38 will be shifted opposite to the direction of arrow B. Disc 39 participates in this shift and moves into contact with the cooperating disc 49, thus bringing the discs into engagement and connecting shaft 13 with motor 50. When the supply of current to coil 47 is interrupted and disc 39 is urged back into contact with part 41 of the casing by the restoring spring 42 retracting the plunger 38, the system is immediately braked.

The magnetic clutch 47 is activated by a switch 23 via relay 24 as shown in FIG. 2a. Spring 42 causes the system to brake instantaneously as soon as coil 47 is de-energised. The sewing machine shown in FIG. 2 differs from the form of construction shown in FIG. 1 also in that the tachometer generator and relay 31 with its contact 30 are replaced by a condenser 51.

When the sewing machine is started up, switch 23 is closed whereupon relay 24 is energised over circuit 101, 102 and 103, closing contact switches 26 and 27. The arm shaft 3 is accelerated to its full high speed of revolution and at the same time coil 47 is energised over circuit 104, 105, 106, 107 and 103. Hence clutch disc 16 runs at the speed of the auxiliary shaft 13. Release of the foot pedal 22 disengages clutch disc 10 from the driven member 21 of the clutch. For the time being this leaves relay 24 unaffected, because its coil continues to be energised via holding contact 27 which bridges switch 23 through circuit 104, 108 and 109. Although the circuit through contact 27 is interrupted whenever brush B rides over section J of the slip-ring 5, the continued supply of current to the relay during this period is assured by the discharge of condenser 51 in parallel therewith, the current of the discharge being sufficient to keep the relay 24 energised for these brief intervals of time during which brush B rides over section J. However, when the speed of revolution of the arm shaft 3 has dropped to the predeterminable limiting speed, then the time it takes for brush B to ride across section J is too long for the condenser 51 to maintain the relay in operation. Relay 24 therefore releases and opens contacts 26 and 27, disengaging disc 39 from the cooperating disc 49. Spring 42 causes disc 39 and hence clutch member 16 to be braked immediately.

The circuit and elements associated with the slip-ring 5 and rendered operable by means of reversing switch are again designated by primed reference numerals. By actuation of the reversing switch, the sewing machine will be brought to a stop with the needle in the opposite position.

The sewing machine shown in FIG. 2 offers the same advantages as the machine shown in FIG. 1. However, it has the additional advantage of eliminating the slip-rings in the magnetic clutch as well as replacing the tachometer generator and its associated relay by a condenser.

Figure 3:
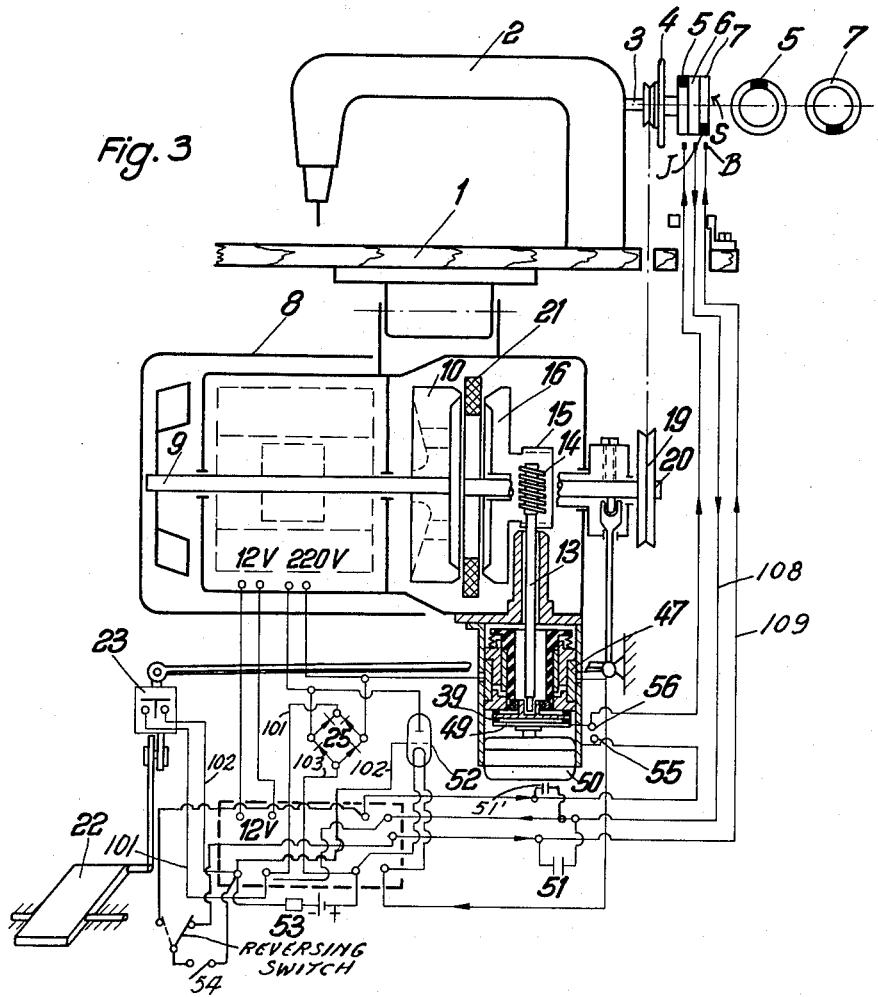
FIGURE 3 is another modified form of construction of a sewing machine with a sequence switching system employing a thyratron valve as the means for controlling the coupling clutch of the auxiliary drive.
Figure 3A:
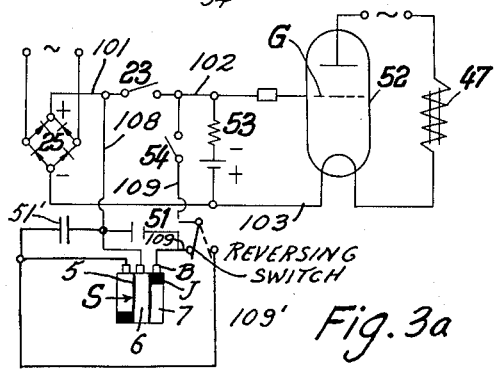
FIGURE 3a is a simplified showing of the circuit used with the system of FIGURE 3.

The sewing machine according to FIG. 3 largely corresponds to that illustrated in FIG. 2. However, in FIG. 3 relay 24 is dispensed with. Instead, the control circuit contains a thyratron valve or tube 52. The anode circuit of this valve is supplied with an A.C. potential, for instance 220 volts. When the thyratron is conductive, a current flows through coil 47 and activates the magnetic clutch. In the alternative case the bias applied through resistor 53 to the grid of the valve blocks the circuit. However, when the grid bias is compensated by the closure of switch 23 the valve will fire and a current will flow through coil 47. When switch 23 is opened again the negative bias is temporarily compensated by the condenser 51, and the magnetic coil remains energised for a predetermined time. Not until the potential of condenser 51 drops to a given lower limit and this will occur when the speed of the arm shaft has dropped to the limiting speed, will the thyratron be quenched by the grid bias and coil 47 be de-energised allowing spring 42 immediately to stop the sewing machine. The holding contact 54 in the illustrated example is constituted by the stationary contact element 55 and the cooperating contact 56 by disc 39.

Since the thyratron operates practically instantaneously, the stopping period is further reduced. Moreover, the synchronising unit is not as heavily loaded by the control current because the latter is smaller when use is made of a thyratron instead of a relay. The life of the synchronising unit S is thus prolonged.

In the further development of the invention, the control means can be so contrived that upon operation of the foot pedal 22 for starting the sewing machine, switch 23 closes before further depression of pedal 22 shifts the driven member 21 into engagement with clutch disc 10.

By also arranging for the driven member 21 of the clutch to remain in engagement with clutch member 16 when switch 23 is first closed, the foot pedal 22 for starting the sewing machine can be operated in such a way as to first cause the arm shaft 3 to start up at slow speed and not to be accelerated to full speed until the foot pedal 22 is further depressed. The operator is thus in a position to start up the sewing machine either slowly or quickly by depressing the foot pedal 22 halfway for the closure of switch 23 or fully for disengaging member 21 from member 16 of the clutch and bringing it into engagement with member 10. Naturally, this also permits the arm shaft 3 to be operated at the slower speed for a longer period of time. It is therefore within the discretion of the operator to perform a sewing operation quickly by fully depressing the foot pedal from its position of rest and by thus immediately running the machine up to high speed or to perform a sewing operation which requires greater care at a lower speed by depressing the foot pedal halfway and by maintaining the same in this position, keeping switch 23 closed and running shaft 3 at the slower speed.

This possibility of first starting up the arm shaft 3 of the machine at slow speed and of subsequently running it at the higher speed by appropriately operating the foot pedal 22 can be readily provided for by fitting switch 23 with a spring which is weaker than the restoring spring associated with the driven member 21 of the clutch.

The drive means for the sewing machine according to the invention permits a sewing machine to be remotely controlled. Control may be such that the sewing machine can be run at high speed for any length of time and at low speed for any length of time, and that it will stop in a position in which the needle is either at top or bottom dead centre, the latter being achieved in all embodiments by means of the reversing switch. A sewing machine which can sew in this manner satisfies a want in the sewing industries.

What we claim is:

1. In a drive arrangement for a sewing machine or the like provided with a shaft and including principal drive means, auxiliary drive means, selectively operable means for selectively and operatively connecting said shaft with said principal drive means or said auxiliary drive means, a control system which enables stoppage of said machine in a predetermined angular position of said shaft, comprising synchronizing means, contact means operative to close upon actuation of said selectively operable means establishing an operative connection of said shaft with said principal drive means and operative to open upon disengagement of said shaft from said principal drive means, means for starting said auxiliary drive means upon establishing the operative connection by said selectively operable means of said shaft with said principal drive means including circuit means, containing said contact means, said synchronizing means being effectively connected in parallel with said contact means, said contact means, upon closure thereof, energizing said circuit means for starting up said auxiliary drive means, and disabling means in said circuit means for effectively switching off said machine in dependence on the rotary speed of said shaft.

2. In a drive arrangement for a sewing machine or the like provided with a shaft and including principal drive means, auxiliary drive means, selectively operable means for selectively and operatively connecting said shaft with said principal drive means or said auxiliary drive means, a control system which enables stoppage of said machine in a predetermined angular position of said shaft, comprising synchronizing means, contact means operative to close upon actuation of said selectively operable means establishing an operative connection of said shaft with said principal drive means and operative to open upon disengagement of said shaft from said principal drive means, means for starting said auxiliary drive means upon establishing the operative connection by said selectively operable means of said shaft with said principal drive means including circuit means, containing said contact means having switch means, said synchronizing means and said switch means being effectively connected in parallel with said contact means, said contact means, upon closure thereof, energizing said circuit means for starting up said auxiliary drive means, and disabling means in said circuit means including said switch means for effectively switching off said machine in dependence on the rotary speed of said shaft.

3. The combination according to claim 1, in which the operation of said control system in starting up the sewing machine first causes the said contact means to be closed whilst the auxiliary drive means remains in driving engagement with the shaft of said machine, and later causes the driving connection between the shaft of said machine and the auxiliary drive to be interrupted and a connection with the principal drive to be established.

4. The combination according to claim 1 in which the operation of said control system in starting up the sewing machine proceeds in two stages, namely a driving connection betwen the auxiliary drive means and the shaft of said machine being established in the first stage, and then a driving connection between the principal drive means and the shaft of said machine being established in the second stage.

5. The combination according to claim 1, wherein the means for starting up the auxiliary drive is a relay.

6. The combination according to claim 1, wherein the means for starting up the auxiliary drive is a valve switching means.

7. The combination according to claim 2, wherein said switch means which opens in dependence upon the speed of rotation of the shaft of said machine is a relay in association with a tachometer generator driven by said shaft and supplying the relay with the current for energizing the same.

8. In a drive arrangement for a sewing machine or the like provided with a shaft and including principal drive means, auxiliary drive means, selectively operable means for selectively and operatively connecting said shaft with said principal drive means or said auxiliary drive means, a control system which enables stoppage of said machine in a predetermined angular position of said shaft, comprising synchronizing means, contact means operative to close upon actuation of said selectively operable means establishing an operative connection of said shaft with said principal drive means and operative to open upon disengagement of said shaft from said principal drive means, means for starting up said auxiliary drive means upon establishing the operative connection by said selectively operable means of said shaft with said principal drive means including a circuit means containing said contact means and having holding contact means, said synchronizing means being effectively connected in parallel with said contact means, said contact means, upon closure thereof, energizing said circuit means for starting up said auxiliary drive means, and disabling means in said circuit means for effectively switching off said machine in dependence on the rotary speed of said shaft, said holding contact means being operative upon opening thereof to effectively disconnect said synchronizing means.

9. In a drive arrangement for a sewing machine or the like provided with a shaft and including principal drive means, auxiliary drive means, selectively operable means for selectively and operatively connecting said shaft with said principal drive means or said auxilary drive means, a control system which enables stoppage of said machine in a predetermined angular position of said shaft, comprising synchronizing means, contact means operative to close upon actuation of said selectively operable means establishing an operative connection of said shaft with said principal drive means and operative to open upon disengagement of said shaft from said principal drive means, means for starting up said auxiliary drive means upon establishing the operative connection by said selectively operable means of said shaft with said principal drive means including a circuit means containing said contact means and having holding contact means and switch means, said synchronizing means and said switch means being effectively connected in parallel with said contact means, said contact means, upon closure thereof, energizing said circuit means for starting up said auxiliary drive means, and disabling means in said circuit means including said switch means for effectively switching off said machine in dependence on the rotary speed of said shaft, said holding contact means being operative upon opening thereof to effectively disconnect said synchronizing means and said switch means.

10. In a drive arrangement for a sewing machine or the like provided with a shaft and including principal drive means, auxiliary drive means, selectively operable means for selectively and operatively connecting said shaft with said principal drive means or said auxiliary drive means, a control system which enables stoppage of said machine in a predetermined angular position of said shaft, comprising synchronizing means, contact means operative to close upon actuation of said selectively operable means establishing an operative connection of said shaft with said principal drive means and operative to open upon disengagement of said shaft from said principal drive means, means for starting said auxiliary drive means upon establishing the operative connection by said selectively operable means of said shaft with said principal drive means including circuit means containing said contact means, said synchronizing means being effectively connected in parallel with said contact means, said contact means, upon closure thereof, energizing said circuit means for starting up said auxiliary drive means, and disabling means in said circuit means including condenser means in said circuit means for effectively switching off said machine in dependence on the rotary speed of said shaft.

11. In a drive arrangement for a sewing machine or the like provided with a shaft and including principal drive means, auxiliary drive means, selectively operable means for selectively and operatively connecting said shaft with said principal drive means or said auxiliary drive means, a control system which enables stoppage of said machine in a predetermined angular position of said shaft, comprising synchronizing means, contact means operative to close upon actuation of said selectively operable means establishing an operative connection of said shaft with said principal drive means and operative to open upon disengagement of said shaft from said principal drive means, means for starting said auxiliary drive means upon connecting said shaft with said principal dirve means by said selectively operable means including circuit means containing said contact means and having relay means, said synchronizing means being effectively connected in parallel with said contact means, said contact means, upon closure thereof, energizing said circuit means for starting up said auxiliary drive means, magnetic brake means rendered effective upon release of said relay means, and disabling means in said circuit means for effectively switching off said machine in dependence on the rotary speed of said shaft and for stopping said machine by said brake means.

12. The combination according to claim 10 wherein the time constants of the holding contact of the switch means controlled by the speed of revolution of the shaft of said machine and of the other elements associated with the auxiliary drive means as well as the mass of the coupling members constituted by said auxiliary drive means are small.

13. The combination according to claim 11 wherein said magnetic brake means includes a hollow cylindrical plunger through which the drive shaft of the auxiliary drive means passes, said plunger carrying a disc which is rotatably connected with the drive shaft but axially slidably displaceable thereon in such manner that the disc can be moved into engagement with a cooperating disc driven by the auxiliary drive shaft or moved into frictional engagement with a stationary member of the casing.

14. The combination according to claim 13, further comprising a restoring spring associated with the plunger of the magnetic clutch.

15. The combination according to claim 14, wherein said plunger carries a tube for conducting the magnetic flux, said tube simultaneously at least partly slidably guiding the plunger within the stationary core of the magnet and in the stationary part of the casing.

16. In a drive ararngement for sewing machine or the like provided with a shaft and including principal drive means, auxiliary drive means, and selectively operable means for selectively and operatively connecting said shaft with said principal drive means or said auxiliary drive means, the improvement essentially consisting of a control system which enables rapid stoppage of said machine in a predetermined angular position of said shaft, comprising:

first means operatively connected with said auxiliary drive means for starting said auxiliary drive means upon initiation of the engagement of the principal drive means with said shaft;

second means operatively connected with said first means for rendering said first means ineffectual to re-energize said auxiliary drive means upon disconnecting said shaft from said principal drive means;

normally inoperable third means operatively connected with said auxiliary drive means for stopping said auxiliary drive means in a predetermined position;

and fourth means operatively connected with said third means for determining the exact predetermined angular speed at which said third means becomes operative, said second, third and fourth means being effectively connected in parallel with said first means 17. In a drive arrangement for a sewing machine or the like provided with a shaft and including principal drive means, auxiliary drive means, and selectively operable means for selectively and operatively connecting said shaft with said principal drive means or said auxiliary drive means, the improvement essentially consisting of a control system which enables rapid stoppage of said machine in a predetermined angular position of said shaft, comprising:

first means operatively connected with said selectively operable means and with said auxiliary drive means for starting said auxiliary drive means when connecting said shaft with said principal drive means;

second means operatively connected with said first means to prevent restarting of the auxiliary drive means once de-energized upon disengaging said shaft from said principal drive means irrespective of the other operating conditions of the control system;

normally inoperative third means including synchronizing means operatively connected with said auxiliary drive means for accurately determining the position of stoppage of said shaft by said auxiliary drive means;

and fourth means operatively connected with said third means for determining the angular speed at which said third means becomes operative, said second, third and fourth means being operatively connected in parallel with said first means.

18. In a drive arrangement for a sewing machine or the like provided with a shaft and including principal drive means, auxiliary drive means, and selectively operable means for selectively and operatively connecting said shaft with said principal drive means or said auxiliary drive means, the improvement essentially consisting of a control system which enables rapid stoppage of said machine in a predetermined angular position of said shaft, comprising:

first means operatively connected with said selectively operable means and with said auxiliary drive means for starting said auxiliary drive means when connecting said shaft with said principal drive means;

second means operatively connected with said first means for rendering said first means ineffectual upon disconnecting said shaft from said principal drive means;

normally inoperative third means including synchonizing means operatively connected with said auxiliary drive means for accurately determining the position of stoppage of said shaft by said auxiliary drive means;

and fourth means including means operable substantially only at a single predetermined speed and operatively connected with said third means for determining the angular speed at which said third means becomes operative, said second, third and fourth means being effectively connected in parallel with said first means.

19. In a drive arrangement for a sewing machine or the like provided with a shaft and including principal drive means, auxiliary drive means, and selectively operable means for selectively and operatively connecting said shaft with said principal drive means or said auxiliary drive means, the improvement essentially consisting of a control system which enables rapid stoppage of said machine in a predetermined angular position of said shaft, comprising:

first means operatively connected with said selectively operable means and with said auxiliary drive means for starting said auxiliary drive means when connecting said shaft with said principal drive means including energizing circuit means for said auxiliary drive means containing contact means operatively connected with said selectively operable means to close said contact means upon connecting said shaft with said principal drive means and to open said contact means upon disconnecting said shaft from said principal drive means;

normally inoperative second means including synchronizing means operatively connected with said auxiliary drive means for accurately determining the position of stoppage of said shaft by said auxiliary drive means upon connecting said shaft with said auxiliary drive means by said selectively operable means;

and third means operatively connected with said second means for accurately determining the exact angular speed at which said third means becomes operative, said second and third means being effectively connected in parallel with at least a part of said first means.

20. In a drive arangement for a sewing machine or the like provided with a shaft and including principal drive means, auxiliary drive means, and selectively operable means for selectively and operatively connecting said shaft with said principal drive means or said auxiliary drive means, the improvement essentially consisting of a control system which enables rapid stoppage of said machine in a predetermined angular position of said shaft, comprising:

first means operatively connected with said selectively operable means and with said auxiliary drive means for starting said auxiliary drive means when connecting said shaft with said principal drive means including energizing circuit means for said auxiliary drive means containing contact means operatively connected with said selectively operable means to close said contact means upon connecting said shaft with said principal drive means and to open said contact means upon disconnecting said shaft from said principal drive means;

normally inoperative second means including synchronizing means operatively connected with said auxiliary drive means for accurately determining the position of stoppage of said shaft by said auxiliary drive means;

and third means including means operable substantially only at a single predetermined speed and operatively connected with said second means for determining the angular speed at which said second means becomes operative, said second and third means being effectively connected in parallel at least with a part of said first means.

21. In a drive arrangement for a sewing machine or the like provided with a shaft and including principal drive means, auxiliary drive means, and selectively operable means for selectively and operatively connecting said shaft with said principal drive means or said auxiliary drive means, the improvement essentially consisting of a control system which enables rapid stoppage of said machine in a predetermined angular position of said shaft, comprising:

first means operatively connected with said auxiliary drive means for starting said auxiliary drive means including energizing circuit means for said auxiliary drive means containing contact means operatively connected with said selectively operable means to close said contact means upon connecting said shaft with said principal drive means and to open said contact means upon disconnecting said shaft from said principal drive means;

synchronizing means inoperative above a certain speed of said shaft and operatively connected with the energizing circuit means for accurately determining the position of stoppage of said shaft by said auxiliary drive means;

second means including further means in parallel with said synchronizing means for accurately determining the exact speed at which said synchronizing means becomes operative;

and third means for preventing re-energization of said auxiliary means in the absence of re-closure of said contact means by said slectively operable means, said synchronizing means and said third means being effectively connected in parallel with said first means 22. In a drive arrangement for a sewing machine or the like provided with a shaft and including principal drive means, auxiliary drive means and selectively operable means for selectively and operatively connecting said shaft with said principal drive means or said auxiliary drive means, the improvement essentially consisting of a control system which enables rapid stoppage of said machine in a predetermined angular position of said shaft and which becomes operable at an accurately preselected substantially single speed, comprising:

first means for starting and stopping said auxiliary drive means;

second means in said first means operatively connected with said selectively operable means for starting said auxiliary drive means when operatively connecting said shaft with said principal drive means by said selectively operable means;

normally inoperative third means in said first means for determining the position at which said auxiliary drive means is stopped including further means for accurately determining the exact speed at which said third means becomes operative;

and means interconnecting said second and third means effectively in parallel with each other in such a manner as to prevent re-energization of said auxiliary drive means once said auxiliary drive means is caused to stop by said second means in the absence of actuation of said selectively operable means to connect said shaft with said principal drive means.

23. In a drive arrangement for a sewing machine or the like provided with a shaft and including principal drive means, auxiliary drive means, and selectively operable means for selectively and operatively connecting said shaft with said principal drive means or said auxiliary drive means, the improvement consisting of a control system which enables rapid stoppage of said machine in a predetermined angular position of said shaft and which becomes operable at a predetermined accurately preselected speed of said shaft, comprising:

circuit means for starting and stopping said auxiliary drive means;

contact means in said circuit means operatively connected with said selectively operable means for starting said auxiliary drive means when said shaft is operatively connected with said principal drive means by said selectively operable means;

normally inoperable synchronizing means operatively connected in said circuit means for determining the position at which said auxiliary drive means is stopped including further means for accurately determining the exact speed at which said synchronizing means becomes effective;

and means including holding means interconnecting said circuit, contact, and synchronizing means in such a manner as to prevent re-energization of said auxiliary drive means once said auxiliary drive means is de-energized by said contact means, said synchronizing means and holding means being effectively connected in parallel with said contact means.

24. In a drive arrangement for a sewing machine or the like provided with a shaft and including principal drive means, auxiliary drive means and selectively operable means for selectively and operatively connecting said shaft with said principal drive means or said auxiliary drive means, the improvement essentially consisting of a control system which enables rapid stoppage of said machine in a predetermined angular position of said shaft and which becomes operative at a predetermined accurately selected speed of said shaft, comprising:

a control circuit for said auxiliary drive means;

contact means in said control circuit and operatively connected with said selectively operable means to effectively start said auxiliary drive means upon actuating said selectively operable means for establishing a driving connection between said shaft and said principal drive means and to prevent restarting of said auxiliary drive means upon severing said driving connection;

and synchronizing means operatively connected in parallel with said contact means for stopping said shaft in a predetermined position upon severing said operative connection including further means in parallel with said synchronizing means for determining the exact speed at which said synchronizing means becomes operable and means in series with said synchronizing means to prevent re-energization once said synchronizing means has been rendered effective by said further means.

References Cited in the file of this patent

UNITED STATES PATENTS

| | | |
|---|---|---|
| 2,920,221 | Schwab | Jan. 5, 1960 |
| 2,942,564 | Larys et al. | June 28, 1960 |
| 2,999,575 | Schwab | Sept. 12, 1961 |
| 3,025,676 | Millar | Mar. 20, 1962 |
| 3,026,834 | Frentzel | Mar. 27, 1962 |

FOREIGN PATENTS

| | | |
|---|---|---|
| 779,875 | Great Britain | July 24, 1957 |
| 500,729 | Italy | Nov. 20, 1954 |